(12) United States Patent
Zhuravlev

(10) Patent No.: US 12,280,970 B2
(45) Date of Patent: Apr. 22, 2025

(54) MODULAR HANDLING SYSTEM OF TUBULAR ELEMENTS

(71) Applicant: VAMMI S.r.l., Trento (IT)

(72) Inventor: Alexey Zhuravlev, Trento (IT)

( * ) Notice: Subject to any disclaimer, the term of this patent is extended or adjusted under 35 U.S.C. 154(b) by 349 days.

(21) Appl. No.: 17/935,086

(22) Filed: Sep. 24, 2022

(65) Prior Publication Data
US 2023/0416022 A1 Dec. 28, 2023

(30) Foreign Application Priority Data
Jun. 23, 2022 (IT) .......................... 102022000013270

(51) Int. Cl.
*B23Q 3/06* (2006.01)
*B65G 65/00* (2006.01)

(52) U.S. Cl.
CPC .............. *B65G 65/00* (2013.01); *B23Q 3/06* (2013.01); *B65G 2814/0311* (2013.01)

(58) Field of Classification Search
CPC .. B65G 65/00; B65G 2814/0311; B23Q 3/06; B23Q 7/001; B23Q 7/05; B23Q 7/042; B23Q 1/76; B23K 37/0538; B23K 37/0211
USPC ......... 414/22.62, 745.8, 746.7, 746.4, 745.9, 414/746.1, 746.2, 746.8
See application file for complete search history.

(56) References Cited

U.S. PATENT DOCUMENTS

| | | | |
|---|---|---|---|
| 2,166,608 A * | 7/1939 | Postlewaite | B29C 31/002 414/746.3 |
| 2,500,204 A * | 3/1950 | Ronay | B23K 37/053 248/55 |
| 2,519,837 A * | 8/1950 | Lampard | B21D 43/006 414/433 |
| 3,854,614 A * | 12/1974 | Albrecht | B27B 25/02 226/177 |
| 3,963,231 A * | 6/1976 | Cooper | B23K 37/0538 269/130 |

(Continued)

FOREIGN PATENT DOCUMENTS

| CN | 201645064 | 11/2010 |
|---|---|---|
| CN | 110509100 | 11/2019 |
| CN | 113369964 | 9/2021 |

OTHER PUBLICATIONS

Italian Patent and Trademark Office, Search Report, Feb. 9, 2023—Relevant portions are in English.

*Primary Examiner* — Gregory W Adams
(74) *Attorney, Agent, or Firm* — Themis Law; Franco A. Serafini

(57) ABSTRACT

A modular handling system of tubular elements includes processing stations and loading and unloading areas. Each processing station includes a support structure and one or more modules operatively coupled to the support structure and configured to receive a tubular element in support. The modules are arranged sliding on the support structure along a first longitudinal axis thereof and each module includes a movement unit of the tubular elements having a longitudinal mover of the tubular elements so as to enable a movement of the tubular elements along the first longitudinal axis, and a rotation system of the tubular elements about a second longitudinal axis of the tubular elements. The modular system further includes a translator coupled to the support structure for moving the tubular elements between the loading and unloading areas and the processing stations.

9 Claims, 2 Drawing Sheets

(56) References Cited

U.S. PATENT DOCUMENTS

| | | | | |
|---|---|---|---|---|
| 7,537,424 | B2* | 5/2009 | Innes | E21B 19/155 |
| | | | | 414/22.62 |
| 9,039,329 | B2* | 5/2015 | Farley | B23P 19/02 |
| | | | | 405/184 |
| 9,725,250 | B2* | 8/2017 | Thomas | B08B 9/0321 |
| 10,612,692 | B2* | 4/2020 | Cowie | B63B 35/03 |
| 2015/0217950 | A1* | 8/2015 | Schopf | B23K 37/047 |
| | | | | 414/800 |

* cited by examiner

MODULAR HANDLING SYSTEM OF TUBULAR ELEMENTS

FIELD OF THE INVENTION

The present invention is applicable to the field of processing metallic tubular elements. More particularly, the present invention relates to a device for handling the tubular elements within a production sector.

BACKGROUND OF THE INVENTION

In the construction and maintenance of tubular elements which occurs within a company's production sectors, the tubular elements must be moved from one processing station to another. It is known, however, that sometimes such movements are not easy as a consequence of the significant size and weight which the tubular elements reach once they are made or assembled.

To date, the tubular elements are moved from one processing station to another manually with a considerable waste of time and, moreover, with considerable risks to the safety of the operators who perform such tasks.

To overcome such drawbacks, in the prior art, the use of particular electric carriages designed to transport long and heavy products such as, indeed, bundles of tubular elements or beams is often used.

However, such a solution has some recognized drawbacks.

In fact, the carriages of the prior art are very bulky and therefore require ample room for manoeuvring within the production sector.

Moreover, the processing stations of the prior art typically allow the management of tubular elements of predetermined maximum length. If there are significant variations in the size of the tubular elements to be processed, it is typically necessary to prepare new processing lines in addition to the previous ones with a significant increase in production costs and dimensions.

Furthermore, with the carriages of the known art it is only possible to move the tubular elements horizontally from one processing station to another. Conversely, to lift them and put them on the carriage or move them from the carriage to the processing station, a special tool suitable for lifting must be used, for example a hoist. It is evident, however, that the use of lifts and movers which act from above also pose a significant risk to the health of operators.

Not only that. In the prior art, the production and processing of the tubular elements occurs on different stations detached from each other, with loading and unloading areas also located in different areas of the production area. As previously mentioned, on such occasions, it is the users involved in the processing itself who also see to, manually or with the help of electric carriages, the movement between the above-mentioned areas, resulting in a considerable waste of energy and time.

SUMMARY OF THE INVENTION

The object of the present invention is to at least partially overcome the drawbacks highlighted above by providing a compact but at the same time versatile handling system of tubular elements.

In particular, an object of the present invention is to provide a handling system of tubular elements which allows it to be adapted to the size of the tubular element to be handled and to the different needs of the user which may change over time.

It follows that another object of the present invention is to provide a handling system of tubular elements which allows cost savings with respect to what occurs in the prior art.

Again, another object of the present invention is to provide a handling system of tubular elements which saves processing time with respect to equivalent processing systems of the prior art.

Moreover, another object of the present invention is to provide a handling system of tubular elements which ensures the safety of the user located near the tubular element being handled.

Said objects, as well as others which will become clearer below, are achieved by a handling system of tubular elements in accordance with the following claims, which are to be considered an integral part of the present patent.

In particular, the handling system of tubular elements is modular and comprises at least one processing station and at least one loading and unloading area.

Advantageously, the modular character allows to make the handling system adaptable to the dimensions of the tubular element on which to perform the processing operations. Not only that, but the modularity of the handling system of the invention also makes it possible to place loading and unloading areas and processing stations in the most convenient and useful position for the user who must proceed with the processing of the tubular elements.

According to an aspect of the invention, the processing station comprises at least one support structure and one or more modules operatively coupled thereto and shaped to receive at least one tubular element in support. More specifically, the modules are arranged sliding on the support structure along a first longitudinal axis thereof thus allowing, as mentioned above, a movement of the processing stations along the support structure according to the needs of the user.

This advantageously allows to handle the modules on the support structure and thus, once again, this allows to make the modular handling system adaptable to processing needs and more versatile with respect to the movers of the prior art.

According to another aspect of the invention, each of the modules comprises at least one movement unit of the tubular elements having at least one longitudinal mover of the tubular elements.

Advantageously, the presence of the longitudinal mover allows a movement of the tubular elements along the first longitudinal axis.

It follows that the longitudinal mover advantageously allows to move the tubular element present on the processing station on a subsequent processing station placed along the same first longitudinal axis.

Moreover, according to another aspect of the invention, each module also comprises means for rotating the tubular elements around a second longitudinal axis of the tubular elements.

Advantageously, the rotation means allow to rotate the tubular element on itself and thus, still advantageously, to allow the user to work on the entire outer surface of the tubular element.

According to a further aspect of the invention, each module comprises at least one translator for handling the tubular elements between the loading and unloading area and the processing station.

Advantageously, the presence of the translator allows to mechanically move the tubular elements from one area to another without needing to proceed manually.

In addition, the translator also allows the passage from one processing station to another processing station placed next to the first one transversely with respect to the support structure.

It follows that the translator allows a faster processing of the tubular elements, eliminating waiting times.

Furthermore, still advantageously, the translator allows to make the movement of the tubular elements safer for the user with respect to what occurs in the prior art by virtue of the fact that the user is not called to contribute to the movement of the tubular element being processed.

In fact, according to another aspect of the invention, the translator comprises at least one supporting portion of the tubular elements. More in detail, the supporting portion is shaped so as to lift the tubular element from the loading and unloading area and, thanks to the translator, move it towards a processing station, and vice versa.

Moreover, advantageously, the fact that the translator is comprised in a single device together with the longitudinal mover and the rotation means, allows to have a compact and versatile handling system which allows the complete control of the tubular element in all the handling to which it must be subjected.

Still advantageously, this allows a considerable saving of money.

Furthermore, it is evident that with the modular handling system of tubular elements of the invention, it is possible to carry out processing on the tubular elements even in smaller spaces since for the movement thereof it is not necessary, unlike in the prior art, to have large spaces for movement manoeuvres.

From the above, it is evident that said objects and advantages are also achieved by an assembly for handling tubular elements comprising a modular handling system such as that mentioned above and provided with a plurality of processing stations arranged parallel to each other.

BRIEF DESCRIPTION OF THE DRAWINGS

Further features and advantages of the invention will become more apparent in the light of the detailed disclosure of a preferred, but not exclusive, embodiment of a modular handling system of tubular elements and an assembly of modular handling systems of tubular elements according to the invention, illustrated by way of non-limiting example with the aid of the accompanying drawings in which.

DETAILED DISCLOSURE OF EMBODIMENTS OF THE INVENTION

With reference to the aforementioned figures, a modular handling system 1 of tubular elements according to the invention is described.

In particular, as just mentioned, the handling system 1 of tubular elements is modular and comprises a processing station 2 and a plurality of loading and unloading areas 3.

Figure 1:
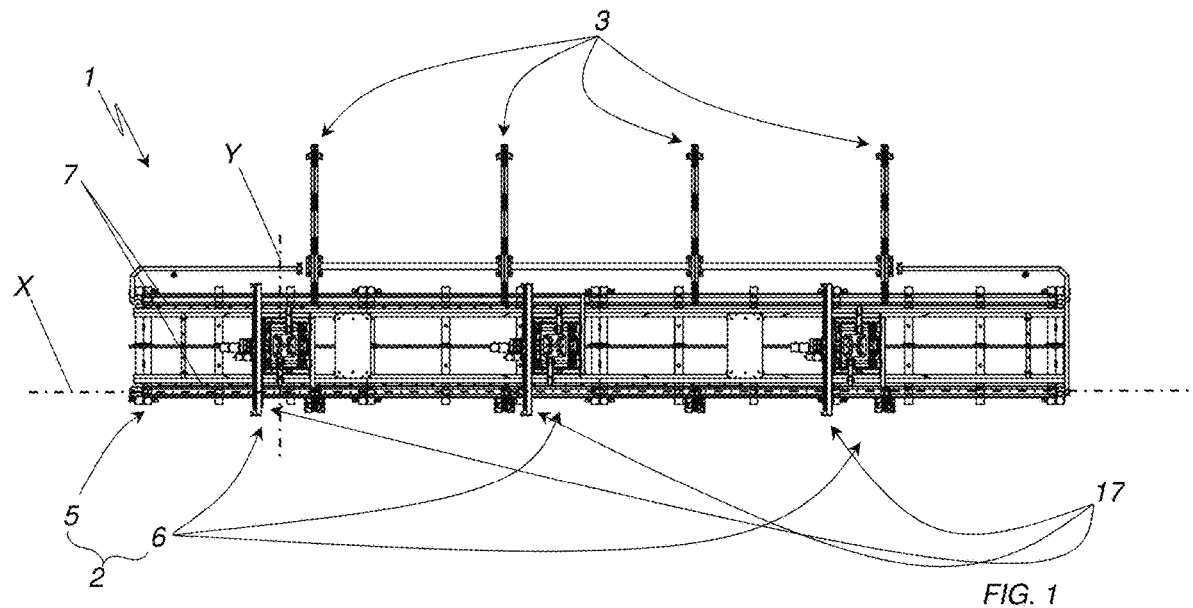
FIG. 1 depicts a modular handling system of tubular elements according to the invention, seen from above.

As we will see below, the modular character makes the handling system 1 adaptable to the size and weight of the tubular element on which to perform the processing. Not only that. The modularity of the handling system 1 of the invention also makes it possible to place loading and unloading areas 3 and processing stations 2 in the most convenient and useful position for the user who must proceed with the processing of the tubular elements. With reference to the loading and unloading areas 3, it should be noted that in the embodiment shown in FIG. 1 they are positioned on only one side of the modular handling system 1. However, such an aspect must not be considered limiting for different embodiments of the invention according to which the loading and unloading areas are present on both sides of the modular handling system.

According to an aspect of the invention, the processing station 2 comprises a support structure 5 and several modules 6 operatively coupled thereto and shaped to receive a tubular element in support. For greater clarity of the executive details of the invention, the tubular elements are not depicted in the figures, however it should be noted that they are arranged longitudinally with respect to the support structure 5.

In regard to the modules 6, they can be in any number, without any limit for the present invention, being, however, removable with respect to the support structure 5.

The aforementioned modularity of the handling system 1 is allowed, first of all, precisely by the possibility of coupling any number of modules 6 to the support structure 5. Advantageously, it follows that with the handling system 1 of the invention, the user can perform processing on more or less heavy and/or flexible tubular elements since the support thereof is ensured by the modules 6 which can be in a greater number in the case of very heavy or very flexible tubular elements.

In the particular embodiment depicted and described here, the support structure 5 comprises a pair of rails 7 shaped to receive the modules 6 in support which are thus arranged sliding on the support structure 5 along a first longitudinal axis X thereof.

Advantageously, the above allows to make the modular handling system 1 more adaptable to processing needs and more versatile with respect to the movers of the prior art.

It is evident, however, that the presence of the rails 7 must not be considered a limiting feature for different embodiments of the invention according to which, by way of non-limiting example, the modules comprise one or more wheels arranged at the base thereof adapted to slide on the support structure. The same applies with reference to the number of rails, which can be in any number without any limitation for the present invention.

Figure 2:
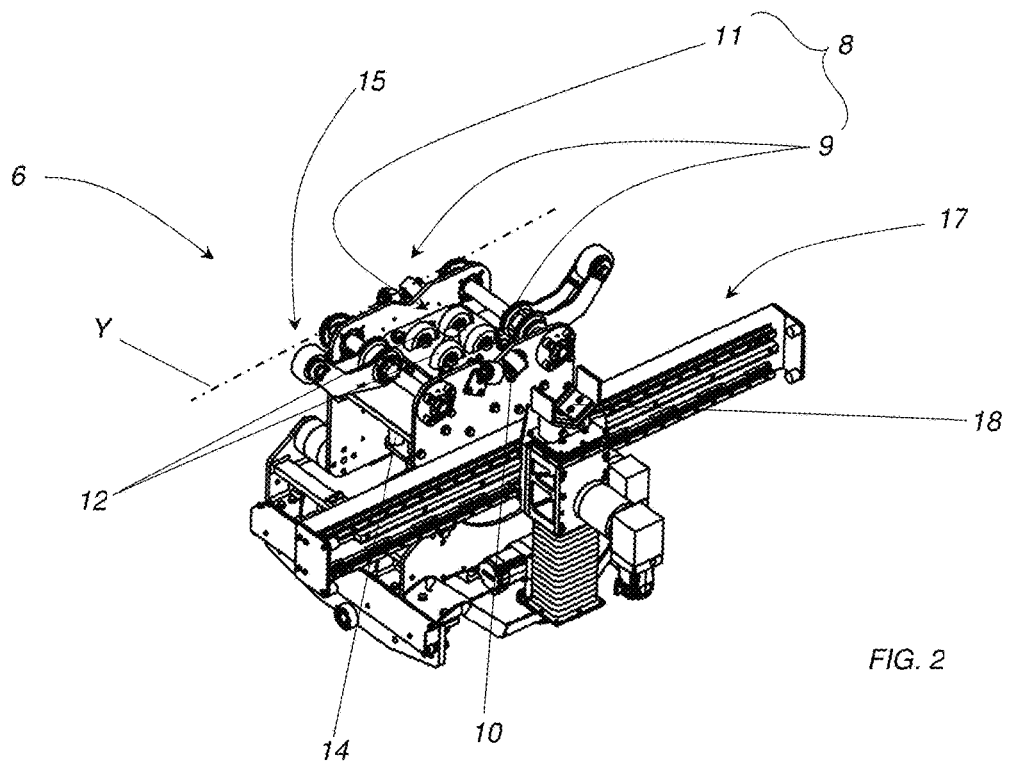
FIG. 2 depicts a detail of the modular handling system of tubular elements of FIG. 1.

According to another aspect of the invention, each of the modules 6 comprises, as can be seen in the detail of FIG. 2, a movement unit 8 of the tubular elements having at least one longitudinal mover 9 of the tubular elements.

Advantageously, the presence of the longitudinal mover 9 allows a displacement of the tubular elements along the first longitudinal axis X.

It follows that the longitudinal mover 9 allows, advantageously, to move the tubular element back and forth during the processing thereof.

In the specific embodiment described, according to an aspect of the invention, the longitudinal mover 9 comprises two pairs of first bearings 10 rotatable according to a transverse axis Y with respect to the first longitudinal axis X and shaped so as to receive the tubular elements in support. However, such an aspect must not be considered limiting neither in terms of the type of longitudinal mover nor in terms of the number of first rotatable bearings, since both of the aforementioned features can be any.

According to another aspect of the invention, each module 6 further comprises rotation means 11 of the tubular elements around a second longitudinal axis proper to the tubular elements.

In particular, according to a further aspect of the invention, the rotation means 11 comprise two pairs of second bearings 12 rotatable along to the first longitudinal axis X.

Advantageously, the second rotatable bearings 12 allow the rotation of the tubular elements about the second longitudinal axis of the tubular elements.

Advantageously, the second bearings 12 allow the tubular element to rotate about itself and thus, still advantageously, allow the user to work on the entire outer surface of the tubular element.

Obviously, as for the longitudinal mover 9, also the number and type of the rotation means 11 should not be considered limiting for different embodiments of the invention according to which the rotation means can be of any type and in any number.

Moreover, according to another aspect of the invention, the rotation means 11 comprise a piston 14 arranged lower than the pair of second bearings 12. In particular, since in the described embodiment the longitudinal mover 9 and the rotation means 11 are arranged on the same level, the presence of the piston 14 allows the lifting of the rotation means 11 with respect to the height at which the longitudinal mover 9 operates so that the two do not obstruct each other.

Obviously, the presence of the piston 14 must not be considered a limiting feature for different embodiments of the invention according to which it is not present because the longitudinal mover and the rotation means are placed on different planes, i.e., it is a lifter of different type or, again, it is applied to the longitudinal mover instead of to the rotation means.

Moreover, according to a further aspect of the invention, the rotation means 11 comprise a pair of retaining jaws 15.

Advantageously, the presence of the jaws 15 allows to keep the tubular elements in position during the rotation thereof. In fact, it is known that with the vibration created on the tubular element when the latter is rotated on its own second longitudinal axis, the tubular element could move, thus risking, in addition to the breakage thereof, its exit from the seat on which it is housed for the processing by the user.

Obviously, the number of jaws 15 must not be considered limiting for different embodiments of the invention, since there can be a single retaining jaw or more than one.

As can be seen in the figures, in the embodiment depicted, each module 6 comprises a translator 17 for handling the tubular elements between the loading and unloading area 3 and the processing station 2. Obviously, the placement of the translator 17 must not be considered a limiting feature for different embodiments of the invention. In fact, according to an embodiment variant not shown, the translators are coupled to the support structure and are arranged sliding thereon along the first longitudinal axis so as to arrange them where necessary depending on the size of the tube to be translated.

The number of translators 17 is also not a limiting feature for the present invention.

Advantageously, the presence of translators 17 allows to mechanically move the tubular elements from a loading and unloading area to a processing station and vice versa without the need to proceed manually.

Moreover, the translators 17 allow a considerable saving of time with respect to what occurs in the prior art.

It follows that the translators 17 allow a faster processing of the tubular elements, eliminating waiting times.

Furthermore, still advantageously, the translators 17 allow to make the movement of the tubular elements safer for the user with respect to what occurs in the prior art by virtue of the fact that the user is not called to contribute to the movement of the tubular element being processed, not even to lift it and place it on the translators 17.

In fact, according to another aspect of the invention, each translator 17 comprises at least one supporting portion 18 of the tubular elements. More in detail, the supporting portion 18 is shaped so as to lift the tubular element from the loading and unloading area 3 and, by virtue of the translator 17, move it towards a processing station 2, and vice versa.

Moreover, in order to facilitate the movement of the tubular elements from the loading and unloading area 3 to the supporting portion 18 of the translator 17, the loading and unloading area 3 comprises a rocker, not depicted here, placed on the upper end of the loading and unloading area 3. In particular, the rocker allows to move the tubular elements arranged in support on the loading and unloading area 3 towards the direction in which the tubular element must be collected by the translator 17 in order to be moved.

Obviously, the presence of the rocker arm must not be considered a limiting feature for different embodiments of the invention according to which it is not present.

In any case, it is advantageously observed that the translators 17 are comprised in a single device together with the longitudinal mover 9 and the rotation means 11. This allows to have a compact and versatile modular handling system 1 which allows complete control of the tubular element in all the handling to which it must be subjected.

Still advantageously, this allows a considerable saving of money.

Furthermore, it is evident that with the modular handling system 1 of tubular elements of the invention, it is possible to carry out processing on the tubular elements even in smaller spaces since for the movement thereof it is not necessary, unlike in the prior art, to have large spaces for movement manoeuvres.

Figure 3:
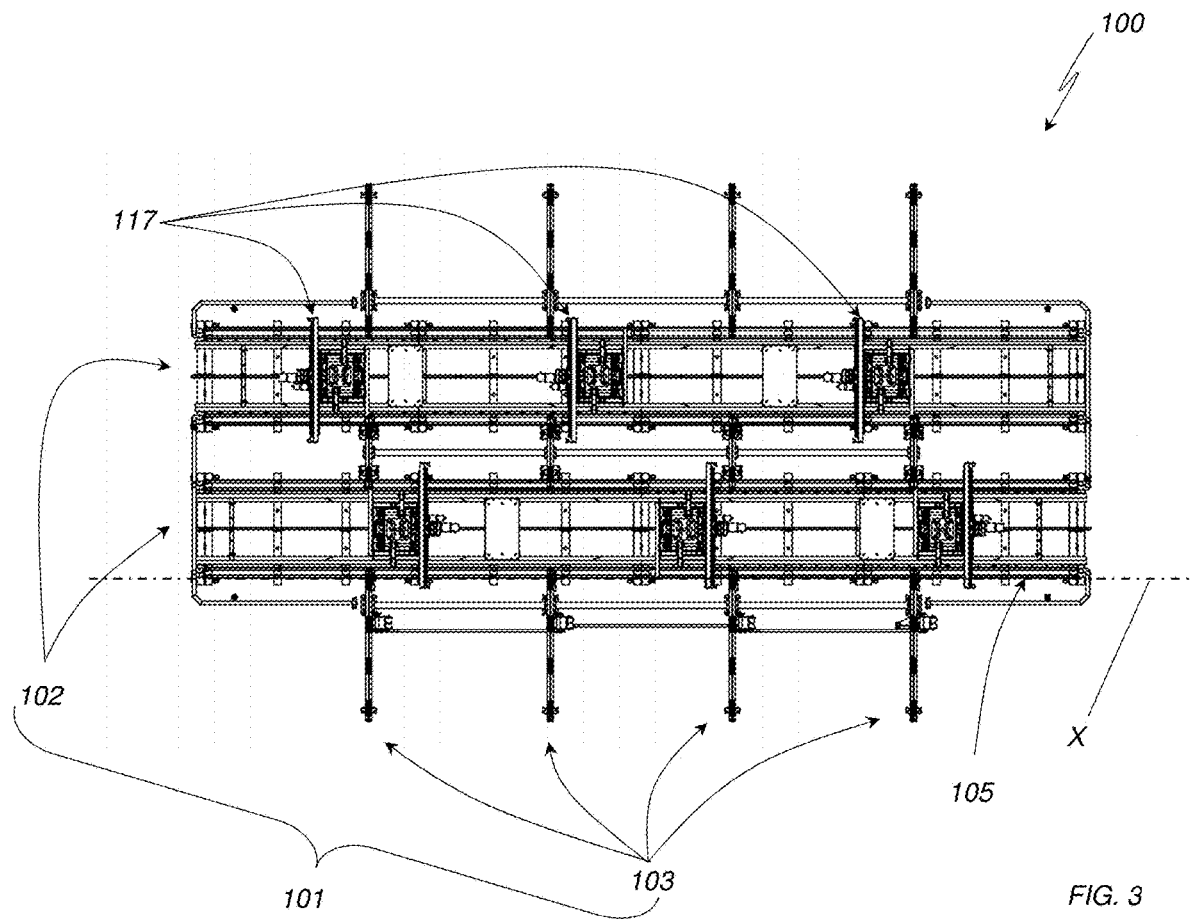
FIG. 3 depicts an assembly of modular handling systems of tubular elements according to the invention, seen from above.

From the foregoing, it is evident that the object of the invention is also, as shown in FIG. 3, an assembly 100 of modular handling systems 101 of tubular elements comprising a modular handling system 101 such as that described above, but provided with a plurality of processing stations 102 arranged parallel to each other.

Moreover, according to another aspect of the invention, the assembly 100 of modular handling systems 101 comprises a plurality of loading and unloading areas 103 interposed between each processing station 102.

Thereby, the unloading area 103 of a previous processing station 102 is also the loading area 103 of a subsequent processing station 102. Advantageously, the above allows a continuous and dynamic processing of the tubular elements as occurs in an assembly chain. In fact, in such a case, the translator 117 allows the passage from one processing station 102 to the other, or from a loading and unloading area 103 to a processing station 102 and vice versa without time intervals and in total autonomy, without the need for manual intervention by the user.

Still advantageously, this allows a considerable saving of time in processing the tubular elements.

Moreover, advantageously, the aforementioned once again allows reducing, if not eliminating, the risks to the health of the user.

Alternatively, according to an embodiment variant not depicted here, the assembly comprises a pair of loading and unloading areas operatively arranged upstream and downstream of the plurality of processing stations. In such a sense, the processing of the tubular elements is continuous from one processing station to the next without passing through stall moments on loading and unloading areas. It is evident that in such a sense the processing times of the tubular elements are further reduced.

Moreover, the assembly 100 is shaped to allow a continuous processing of the tubular elements from right to left and vice versa.

From what has been said, it is clear that the manner of arrangement of the loading and unloading areas and of the processing stations can be any, without any limit for the present invention; for example, the loading and unloading areas can be interposed between two or more processing stations.

This allows to once again make the assembly 100 extremely adaptable to the needs of the user with the possibility of creating any combination.

Not only that, the assembly 100 is also adaptable to the length of the tubular elements to be processed. In fact, as far as not depicted in the figures, the support structure 105 comprises a coupler which, advantageously, allows to have several support structures 105 aligned with one another according to the first longitudinal axis X.

The coupler advantageously allows to accommodate tubular elements T of any length.

Still advantageously, the above allows a further saving of money for the user who only needs additional support structures to adapt the assembly 100 to his needs for processing the tubular elements.

Not only that. The modular nature of the handling system 101 and the possibility of creating any combination between the processing stations 102 and the loading and unloading areas 103 allows for an extremely compact assembly 100 with the consequent advantage that it does not require large spaces in the company's production sector.

In light of the foregoing, it is understood that the handling system of tubular elements of the invention achieves all the prefixed objects.

In particular, the handling system of tubular elements as well as the assembly of handling systems of tubular elements of the invention are compact, but at the same time versatile.

In particular, they are adaptable to the dimensions of the tubular element to be handled and to the different needs of the user which may change over time.

It follows that the handling system of tubular elements of the invention as well as the assembly of handling systems of tubular elements allow cost savings with respect to what occurs in the prior art.

Furthermore, they allow a saving of processing times with respect to the equivalent processing systems of the prior art.

Moreover, the modular handling systems for tubular elements as well as the assembly of handling systems of tubular elements ensure the safety of the user who is close to the moving tubular element.

The invention might be subject to many changes and variants, which are all included in the appended claims. Moreover, all the details may furthermore be replaced by other technically equivalent elements, and the materials may be different depending on the needs, without departing from the protection scope of the invention defined by the appended claims.

The invention claimed is:

1. A modular system for handling tubular elements comprising:
    at least one processing station; and
    at least one loading and unloading area,
    said at least one processing station comprising at least one support structure and one or more modules operatively coupled to said at least one support structure and configured to support at least one tubular element,
    said one or more modules being arranged to slide on said at least one support structure along a first longitudinal axis of said at least one support structure,
    each of said one or more modules comprising at least one movement unit of the tubular elements having:
    at least one longitudinal mover of the tubular elements so as to allow a displacement of the tubular elements along said first longitudinal axis;
    a rotation system of the tubular elements about a second longitudinal axis of the tubular elements,
    said modular system further comprising at least one translator coupled to said at least one or more modules for moving the tubular elements between said at least one loading and unloading area and said at least one processing station,
    wherein said at least one translator comprises at least one supporting portion of the tubular elements, said at least one supporting portion being configured to slide perpendicularly to said first longitudinal axis, receive one of said tubular elements, and lift said one of said tubular elements from and to said at least one loading and unloading area, and
    wherein said at least one translator is configured to transport the tubular elements toward said at least one processing station.

2. The modular system according to claim 1, wherein said at least one longitudinal mover comprises at least one pair of first bearings rotatable along a transverse axis with respect to said first longitudinal axis and configured so as to receive the tubular elements in support.

3. The modular system according to claim 1, wherein said at least one support structure comprises at least one rail configured to support at least one of said one or more modules so as to enable a sliding of said one or more modules on said at least one rail.

4. The modular system according to claim 1, wherein said rotation system comprise at least one pair of second bearings rotatable along said first longitudinal axis, said second bearings being shaped so as to enable a rotation of the tubular elements about the second longitudinal axis of the tubular elements.

5. The modular system according to claim 4, wherein said rotation system comprises one or more pistons operatively connected to said at least one pair of second bearings to move said at least one pair of second bearings vertically.

6. The modular system according to claim 4, wherein said rotation system comprises at least one retaining jaw configured to keep the tubular elements in position at least during said rotation.

7. An assembly of modular handling systems of tubular elements according to claim 1, wherein said at least one processing station is a plurality of said processing stations arranged parallel to each other.

8. The assembly of modular handling systems of tubular elements according to claim 7, wherein said at least one loading and unloading area is a pair of said loading and unloading areas operatively arranged respectively upstream and downstream of said plurality of processing stations.

9. The assembly of modular handling systems of tubular elements according to claim 8, further comprising additional loading and unloading areas, each interposed between each processing station of said plurality of processing stations.

\* \* \* \* \*